United States Patent [19]
Nayebi et al.

[11] Patent Number: 5,689,308
[45] Date of Patent: Nov. 18, 1997

[54] VERTICAL RESET GENEREATOR CIRCUIT

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 585,441

[22] Filed: Jan. 11, 1996

Related U.S. Application Data

[60] Provisional application No. 60/000,409, Jun. 21, 1995.

[51] Int. Cl.[6] .................................................. H04N 5/10
[52] U.S. Cl. ................................................ 348/529; 348/525
[58] Field of Search .............................. 348/529, 530, 348/547, 525; H04N 5/08, 5/10

[56] References Cited

U.S. PATENT DOCUMENTS

| | | | |
|---|---|---|---|
| 3,626,209 | 12/1971 | Chandos | 307/268 |
| 4,313,137 | 1/1982 | Weissmueller | 348/529 |
| 4,446,483 | 5/1984 | Duijkers | 348/529 |
| 4,789,896 | 12/1988 | Kishi et al. | 348/529 |
| 4,907,089 | 3/1990 | Yamaguchi et al. | 358/213.31 |
| 4,933,774 | 6/1990 | Ishimaru | 358/335 |
| 4,984,002 | 1/1991 | Kokubo | 358/213.13 |
| 5,402,178 | 3/1995 | Chen | 348/529 |
| 5,467,140 | 11/1995 | Sohn | 348/529 |

*Primary Examiner*—Michael H. Lee
*Attorney, Agent, or Firm*—Haverstock & Associates

[57] ABSTRACT

A vertical reset generator monitors a composite video signal and generates a vertical reset pulse which is active during the presence of serration pulses within the composite video signal. The synchronization pulses within the input composite video signal are separated by a sync separator circuit. The output of the sync separator circuit, including horizontal sync pulses, equalizing pulses and serration pulses, is provided to a charging circuit which charges up a capacitor when the output of the sync separator circuit is at a low level and discharges the capacitor when the output of the sync separator circuit is at a high level. The serration pulses are at a low level for a greater time period than the equalizing pulses. The charge built up across the capacitor is therefore greater during a serration pulse than during an equalizing pulse. An up threshold level is set so that the voltage built up across the capacitor will not reach the threshold during the low level of an equalization pulse but will reach it during the low level of a serration pulse. During the first serration pulse, the charge across the capacitor rises above the up threshold level causing the vertical reset generator to activate a vertical reset pulse. A down threshold level is set so that the voltage across the capacitor will not fall below that level during the high level of a serration pulse but will fall below it during the next equalizing pulse. During the first equalizing pulse after a serration pulse, the charge across the capacitor falls below the down threshold level causing the vertical reset generator to deactivate the vertical reset pulse. The vertical reset pulse remains inactive until the next serration pulse.

18 Claims, 3 Drawing Sheets

VERTICAL RESET GENEREATOR CIRCUIT

RELATED APPLICATIONS

This application claims priority under 35 U.S.C. § 119(e) of the co-pending U.S. provisional application Ser. No. 60/000,409 filed on Jun. 21, 1995 and entitled "Circuitry To Generate Vertical Reset." The provisional application Ser. No. 60/000,409 filed on Jun. 21, 1995 and entitled "Circuitry To Generate Vertical Reset is also hereby incorporated by reference.

FIELD OF THE INVENTION

The present invention relates to the field of generating a vertical reset pulse. In particular, the present invention relates to the field of automatically detecting the presence of serration pulses within a composite video signal and generating a vertical reset pulse.

BACKGROUND OF THE INVENTION

A composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used to sychronize the system for displaying the next line of video information. The burst signal is used to synchronize the phase of the sampling pulses with the phase of the color subcarrier signal. Separator circuits are utilized to separate the horizontal synchronizing signal and the burst signal from the incoming video signal. The burst signal consists of a sinusoid with a frequency equal to 3.58 MHz, which is the frequency of the chrominance subcarrier $f_{sc}$. The video information signal then comprises the chrominance subcarrier having different phases amplitude-modulated with chrominance information. The composite color video signal includes both luminance and chrominance information.

A video picture or frame is made up of a number of horizontal lines included within the video display. To display a video picture or frame the video system begins at the top of the screen and displays the information within the composite video signal one horizontal line at a time. The information for each horizontal line is contained within a horizontal period of the composite video signal. After each horizontal period, the video system moves to the next line and displays the information within the next horizontal period of the composite video system. This continues until the video system reaches the bottom line on the video display. After displaying the video information on the bottom line of the video display, the video system must reset itself to the top of the display in order to begin displaying the next frame. In order to allow the system to reset itself to the top of the video display a vertical blanking period is included within the composite video signal, after the video information for each frame. This vertical blanking period allows the video system to reset to the top of the video display and begin displaying the information for the horizontal lines of the next frame. Therefore, a number of horizontal periods, enough to comprise a frame or screen, are strung together, within the composite video signal. Between each frame, the composite video signal includes a vertical blanking period which allows the video system to perform a vertical reset and prepare to display the next frame by moving back up to the top of the video display.

During the vertical blanking period the composite video signal includes a first period of equalizing pulses, a period of serration pulses and a second period of equalizing pulses. During this vertical blanking period the video system resets itself to the top of the video display so that it is ready to begin displaying the information for the next frame. However, the video system must be notified of or be able to detect the vertical blanking period so that it can reset itself to the top of the video display. The serration pulses carry synchronization information used by the local vertical oscillator, within the video system, during a vertical reset. Because of the need to extract this synchronization information, the video system must also be able to distinguish the serration pulses from the equalizing pulses. What is needed is a vertical reset generator which will monitor the composite video signal and will automatically generate a pulse during the vertical blanking period, signalling to the video system that the current frame is complete and that it is time to reset to the top of the video display.

SUMMARY OF THE INVENTION

A vertical reset generator monitors a composite video signal and generates a vertical reset pulse which is active during the presence of serration pulses within the composite video signal. The synchronization pulses within the input composite video signal are separated by a sync separator circuit. The output of the sync separator circuit, including horizontal sync pulses, equalizing pulses and serration pulses, is provided to a charging circuit which charges up a capacitor when the output of the sync separator circuit is at a low level and discharges the capacitor when the output of the sync separator circuit is at a high level. The serration pulses are at a low level for a greater time period than the equalizing pulses. The charge built up across the capacitor is therefore greater during a serration pulse than during an equalizing pulse. An up threshold level is set so that the voltage built up across the capacitor will not reach the threshold during the low level of an equalization pulse but will reach it during the low level of a serration pulse. During the first serration pulse, the charge across the capacitor rises above the up threshold level causing the vertical reset generator to activate a vertical reset pulse. A down threshold level is set so that the voltage across the capacitor will not fall below that level during the high level of a serration pulse but will fall below it during the next equalizing pulse. During the first equalizing pulse after a serration pulse, the charge across the capacitor falls below the down threshold level causing the vertical reset generator to deactivate the vertical reset pulse. The vertical reset pulse remains inactive until the next serration pulse.

DETAILED DESCRIPTION OF THE PREFERRED EMBODIMENT

Figures 1A, 1B, 1C:
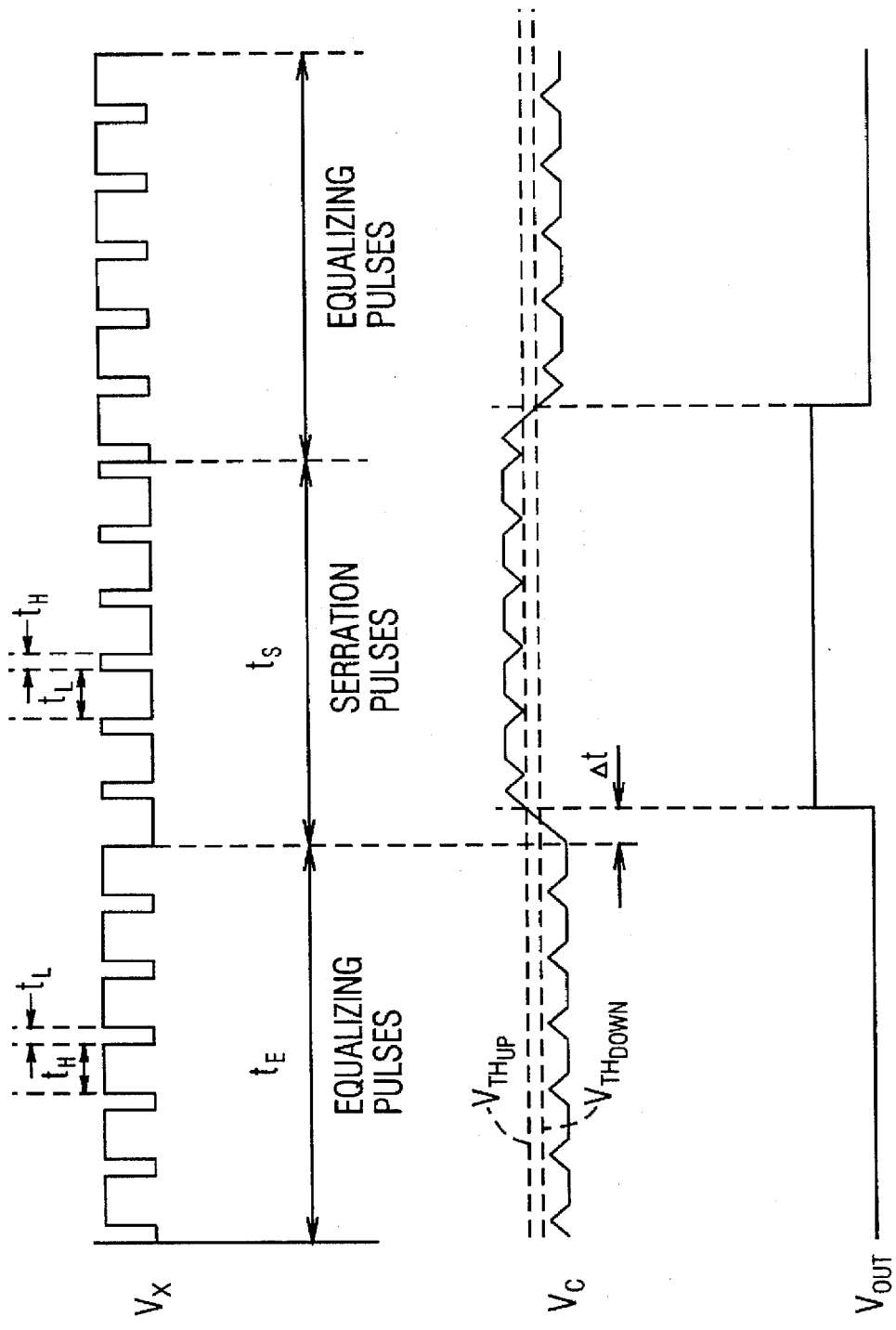
FIG. 1a illustrates a waveform of an output of a sync separator circuit during a vertical period of a composite video signal.
FIG. 1b illustrates a waveform representing a voltage level across a capacitor.
FIG. 1c illustrates a waveform representing an output signal of the vertical reset generator of the present invention.

The vertical reset generator of the present invention monitors the composite video signal in order to detect the vertical blanking period and generate a vertical reset pulse. The vertical reset pulse is then provided to the video system and when active notifies the video system that it is time for a vertical reset. The synchronization pulses within the input composite video signal are separated out by a sync separator circuit. The vertical reset generator then uses a charging circuit to detect the presence of the serration pulses. As illustrated in FIG. 1a, the duty cycle of the serration pulses is much less than the duty cycle of the equalizing pulses. A capacitor is charged up during the time when the output from the sync separator circuit is at a low level and discharged during the time when the output from the sync separator is at a high level. The charge built up across the capacitor will therefore be greater during the serration pulses then during the equalization pulses. A predetermined threshold level is set so that the voltage across the capacitor will not reach the predetermined threshold level during the equalization period but will reach it during the serration period. After the serration pulses, at the beginning of the next equalization period, the capacitor is discharged below the predetermined threshold level and the vertical reset pulse is deactivated by the vertical reset generator of the present invention.

The output VX of a sync separator circuit during a vertical period is illustrated in FIG. 1a. The time period $t_h$ denotes the time when the signal VX is at a high level and the time period $t_1$ denotes the time when the signal VX is at a low level. As illustrated, the low time period $t_1$ for a serration pulse is much greater than the low time period $t_1$ for an equalizing pulse. In a typical composite video signal the low time period $t_1$ for a serration pulse is equal to 29 microseconds (µs) and the low time period $t_1$ for an equalizing pulse is equal to 4.7 µs.

The output VC of a charging circuit, within the vertical reset generator of the present invention, is illustrated in FIG. 1b. Within the vertical reset generator an up threshold voltage level VTHUp is used to activate the vertical reset pulse and a down threshold voltage level VTHDown is used to deactivate the vertical reset pulse. The vertical reset pulse output signal Vout generated by the vertical reset generator is illustrated in FIG. 1c. The FIGS. 1a, 1b and 1c are drawn to correspond in time to each other.

During the equalization period, the output VC of the charging circuit does not reach the up threshold voltage VTHUp level. However, during the first serration pulse, because of the greater low time period $t_1$, the output VC of the charging circuit reaches the up threshold voltage level VTHUp and the vertical reset pulse is activated. The down threshold voltage VTHDown is less than the up threshold voltage VTHUp. During the serration period, the output VC of the charging circuit does not reach the down threshold voltage level VTHDown allowing the vertical reset pulse to remain active for the entire serration period. However, after the serration period, during the first equalizing pulse, the output VC of the charging circuit drops below the down threshold voltage level VTHDown and deactivates the vertical reset pulse.

The vertical reset pulse is active during the serration period and signals to the video system that it is time for a vertical reset. The vertical reset pulse also signals to the video system that the serration pulses are present within the composite video signal. This ensures that the video system will extract the synchronization information from the serration pulses.

Figure 2:
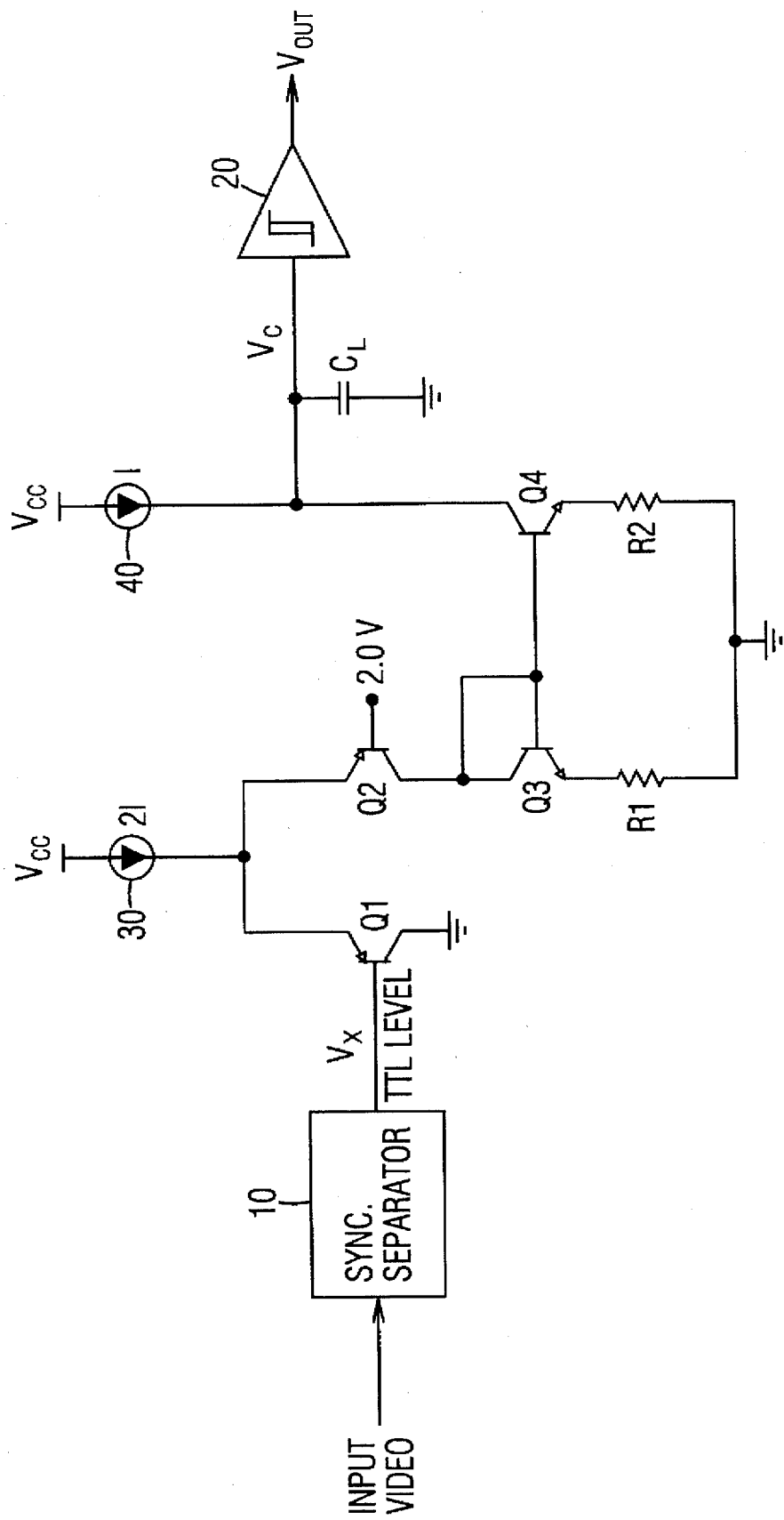
FIG. 2 illustrates a schematic diagram of a vertical reset generator of the present invention.

A schematic diagram of the vertical reset generator of the present invention is illustrated in FIG. 2. The input composite video signal is provided to a sync separator circuit 10. The sync separator circuit 10 separates the synchronization pulses, including the equalization and serration pulses, from the input composite video signal. The output VX from the sync separator circuit 10 is coupled to the base of a pnp transistor Q1. The collector of the transistor Q1 is coupled to ground. The emitter of the transistor Q1 is coupled to the emitter of a pnp transistor Q2 and to the first terminal of a current source 30. The second terminal of the current source 30 is coupled to a supply voltage VCC. The current source 30 provides a current having a value equal to 2I. Together, the transistors Q1 and Q2 form a differential pair.

The base of the transistor Q2 is coupled to a constant voltage signal having a value equal to two volts. The collector of the transistor Q2 is coupled to the collector and base of an npn transistor Q3 and to the base of an npn transistor Q4. The emitter of the transistor Q3 is coupled to the first terminal of a resistor R1. The emitter of the transistor Q4 is coupled to the first terminal of a resistor R2. The second terminal of the resistor R2 is coupled to the second terminal of the resistor R1 and to ground. The transistors Q3 and Q4 are coupled together in a current mirror configuration.

The collector of the transistor Q4 is coupled to the first terminal of a capacitor CL, to the input of a schmitt trigger circuit 20 and to the first terminal of a current source 40, thereby forming an output node VC of a charging circuit of the vertical reset generator. The second terminal of the current source 40 is coupled to the supply voltage VCC. The current source 40 provides a current having a value equal to I. Therefore, the current source 40 provides one half of the current provided by the current source 30. The second terminal of the capacitor CL is coupled to ground.

The output Vout of the schmitt trigger circuit 20 provides the output for the vertical reset generator. The output Vout of the vertical reset generator of the present invention is coupled to provide the vertical reset pulse to the video system in order to signal to the video system that it is time for vertical reset and that the serration pulses are present within the input composite video signal. The output Vout during the equalization and serration periods is illustrated in FIG. 1c.

In operation, the sync separator circuit 10 is provided the input composite video signal and separates the synchronization pulses from the input composite video signal, generating the output signal VX. The output signal VX of the sync separator circuit 10 is a representation of only the synchronization pulses of the input composite video signal. The sync separator circuit 10 includes a comparator circuit and detects the synchronization pulses based on their relative level from the blank level of the input composite video signal. The synchronization pulses separated by the sync separator circuit 10 include horizontal synchronization pulses, equalizing pulses and serration pulses. The equalization and serration pulses have a same relative level from the blank level of the input composite video signal. Therefore, because the sync separator circuit 10 detects the synchronization pulses based on their relative level from the blank level of the input composite video signal, the sync separator circuit 10 cannot distinguish between the equalizing and the serration pulses.

The output VX of the sync separator circuit 10 during a vertical blanking period is illustrated in FIG. 1a. As described above, the time period when the output signal VX is at a high level is denoted as a high time period $t_h$. The time period when the output signal is at a low level is denoted as a low time period $t_l$. The low time period $t_l$ for a serration pulse is much greater than the low time period $t_l$ for an equalizing pulse.

When the output signal VX from the sync separator circuit 10 drops to the low level, the tail current of the differential pair made up of the transistors Q1 and Q2 flows through the transistor Q1 and to ground. This essentially turns off the transistors Q2, Q3 and Q4. When the transistor Q4 is turned off, the capacitor CL is charged up by the current source 40. If the output signal VX is low for a long enough period of time, the voltage VC across the capacitor CL will rise above the up threshold voltage level VTHUp. When the voltage VC across the capacitor CL rises above the up threshold voltage level VTHUp the output signal Vout is raised from a logical low voltage level to a logical high voltage level by the schmitt trigger circuit 20. The voltage VC across the capacitor CL will only rise above the up threshold voltage level VTHUp during the serration period because the low time period $t_1$ for an equalizing pulse is not long enough to raise the voltage VC across the capacitor CL up to an appropriate level. Once the output signal Vout is raised to a logical high voltage level it will remain there until the voltage VC across the capacitor CL is discharged to a voltage level below the down threshold voltage level VTHDown. The down threshold voltage level VTHDown is less than the up threshold voltage level VTHUp.

When the output signal VX from the sync separator circuit 10 goes high, the tail current of the differential pair made up of the transistors Q1 and Q2 flows through the transistor Q2. This turns off the transistor Q1. The current 2I from the current source 30 will therefore flow through the transistors Q2 and Q3. This current 2I is mirrored by the transistor Q4. Because the current source 40 only provides a current level I, the remaining current flowing through the transistor Q4 is provided from the capacitor CL. This will discharge the capacitor CL through the transistor Q4 during a high time period $t_h$ of the output signal VX from the sync separator circuit 10. During a serration period the high time period is not long enough for the voltage across the capacitor CL to be discharged below the down threshold voltage level VTHDown. The vertical reset pulse therefore remains active during the entire serration period.

During the first equalizing pulse after the serration period, the high time period $t_h$ is long enough so that the voltage VC across the capacitor CL is discharged below the down threshold voltage level VTHDown. When the voltage VC across the capacitor CL falls below the down threshold voltage level VTHDown, after the output signal Vout has been at a logical high voltage level, the output signal Vout is lowered from the logical high voltage level to a logical low voltage level by the schmitt trigger circuit 20. Because the low time period $t_1$ is not long enough during an equalizing pulse to raise the voltage level VC across the capacitor CL above the up threshold voltage level VTHUp, the output signal Vout remains at a logical low voltage level until the next serration pulse.

In this manner the vertical reset generator of the present invention generates a vertical reset pulse which becomes active during the first serration pulse and remains active until the first equalizing pulse after the serration period.

Figure 3:
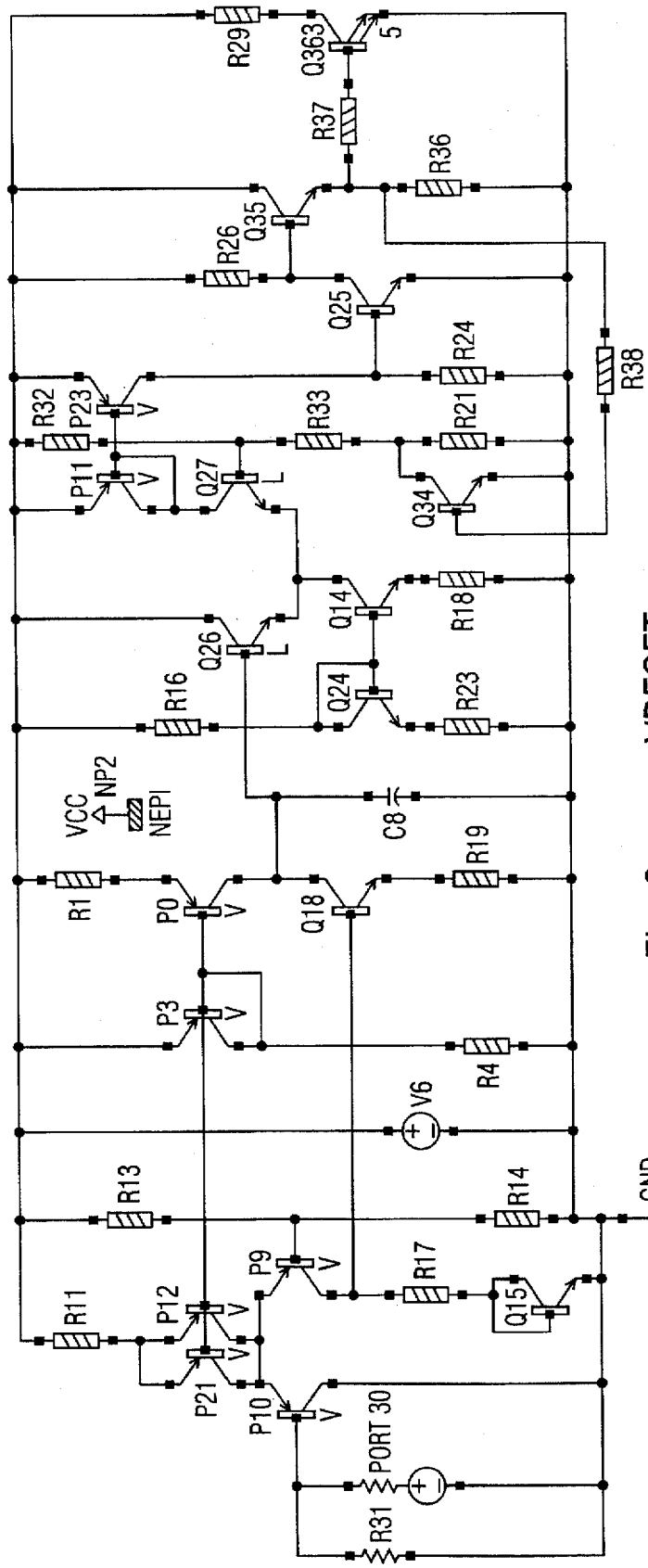
FIG. 3 illustrates a detailed schematic diagram of the vertical reset generator of the present invention.

A detailed circuit schematic of the preferred embodiment of the vertical reset generator circuit is illustrated in FIG. 3.

The preferred embodiment of the present invention is implemented within a video/graphics overlay integrated circuit, Part No. CXA2015Q, which will be available from Sony Corporation of America, 3300 Zanker Road, San Jose, Calif. 95134.

While the preferred embodiment of the present invention has been illustrated and described as an integrated circuit using a bipolar transistor, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A vertical reset generator circuit for generating a vertical reset signal representing a vertical reset time period within a video system, the circuit comprising:
   a. a receiving circuit configured for receiving a composite video signal including equalizing pulses and serration pulses, wherein each of the equalizing and serration pulses have a first level and a second level;
   b. a storage element for storing a level of charge;
   c. a charging and discharging circuit coupled to the storage element for raising and lowering the level of charge within the storage element, wherein the level of charge is raised during the first level and lowered during the second level; and
   d. a signal generating circuit coupled to the storage element for activating a vertical reset signal when the level of charge reaches a first threshold level and deactivating the vertical reset signal when the level of charge reaches a second threshold level, wherein the second threshold level is different than the first threshold level.

2. The vertical reset generator circuit as claimed in claim 1 further comprising a separating circuit coupled to the receiving circuit for separating the equalizing and serration pulses from the composite video signal.

3. The vertical reset generator circuit as claimed in claim 2 further comprising a monitoring circuit coupled to the storage element for monitoring the level of charge within the storage element.

4. The vertical reset generator circuit as claimed in claim 3 wherein the storage element is a capacitor.

5. The vertical reset generator circuit as claimed in claim 4 wherein the second threshold level is less than the first threshold level.

6. The vertical reset generator circuit as claimed in claim 5 wherein the first level is a low level and the second level is a high level.

7. A method of generating a vertical reset pulse within a video system comprising the steps of:
   a. receiving a composite video signal including synchronization pulses, wherein the synchronization pulses include equalizing pulses and serration pulses each having a first level and a second level;

b. building up a level of charge across a storage element during the first level of the equalizing pulses and the serration pulses;

c. discharging the level of charge across the storage element during the second level of the equalizing pulses and the serration pulses;

d. activating a vertical reset signal when the level of charge reaches a first threshold level; and e. deactivating the vertical reset signal when the level of charge reaches a second threshold level, wherein the second threshold level is different than the first threshold level.

8. The method as claimed in claim 7 further comprising the step of separating the equalizing pulses and the serration pulses from the composite video signal.

9. The method as claimed in claim 8 wherein the first level is a low level.

10. The method as claimed in claim 9 wherein the second level is a high level.

11. The method as claimed in claim 10 wherein the storage element is a capacitor.

12. The method as claimed in claim 11 wherein the second threshold level is less than the first threshold level.

13. A method of generating a vertical reset pulse representative of the presence of serration pulses within a composite video signal, comprising the steps of:

a. receiving a composite video signal including equalizing pulses and serration pulses, wherein both the equalizing pulse and the serration pulses have a high level and a low level;

b. separating the equalizing pulses and serration pulses from the composite video signal;

c. charging a voltage level stored across a storage element during the low level of the equalizing pulses and the serration pulses;

d. discharging the voltage level stored across the storage element during the high level of the equalizing pulses and the serration pulses;

e. determining when the voltage level stored across the storage element reaches a first threshold level;

f. activating a vertical reset pulse when the voltage level stored across the storage element reaches the first threshold level, wherein the voltage level stored across the storage element reaches the first threshold level within a first serration pulse after a series of equalizing pulses;

g. determining when the voltage level stored across the storage element reaches a second threshold level; and h. deactivating the vertical reset pulse when the voltage level stored across the storage element reaches the second threshold level, wherein the second threshold level is different than the first threshold level and the voltage level stored across the storage element reaches the second threshold level within a first equalizing pulse after the vertical reset pulse was activated.

14. The method as claimed in claim 13 wherein the storage element is a capacitor.

15. The method as claimed in claim 14 wherein the second threshold level is less than the first threshold level.

16. A vertical reset generator circuit for generating a vertical reset signal representing a vertical reset time period within a video system, the circuit comprising:

a. a receiving circuit configured for receiving a composite video signal including equalizing pulses and serration pulses, wherein each of the equalizing and serration pulses have a first level and a second level;

b. a separating circuit coupled to the receiving circuit for separating the equalizing and serration pulses from the composite video signal;

c. a storage element for storing a level of charge;

d. a charging and discharging circuit coupled to the storage element for charging and discharging the level of charge stored within the storage element, wherein the level of charge is charged during the first level and discharged during the second level;

e. a monitoring circuit coupled to the storage element for monitoring the level of charge within the storage element; and f. a hysteretic signal generating circuit coupled to the monitoring circuit for activating a vertical reset signal when the level of charge reaches a first threshold level and deactivating the vertical reset signal when the level of charge reaches a second threshold level, wherein the second threshold level is less than the first threshold level, and further wherein the level of charge reaches the first threshold level within a first serration pulse after a series of equalizing pulses.

17. The vertical reset generator circuit as claimed in claim 16 wherein the storage element is a capacitor.

18. The vertical reset generator as claimed in claim 1 wherein the signal generating circuit activates the vertical reset signal within a first serration pulse after a series of equalizing pulses.

* * * * *